(12) United States Patent
Lacroix et al.

(10) Patent No.: US 8,619,051 B2
(45) Date of Patent: Dec. 31, 2013

(54) HAPTIC FEEDBACK SYSTEM WITH STORED EFFECTS

(75) Inventors: Robert Andre Lacroix, San Jose, CA (US); Pedro Gregorio, Verdun (CA); Kollin M. Tierling, Milpitas, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 13/195,383

(22) Filed: Aug. 1, 2011

(65) Prior Publication Data

US 2011/0310043 A1    Dec. 22, 2011

Related U.S. Application Data

(63) Continuation of application No. 11/748,219, filed on May 14, 2007.

(60) Provisional application No. 60/890,690, filed on Feb. 20, 2007.

(51) Int. Cl.
*G06F 3/041* (2006.01)
*G09G 5/00* (2006.01)

(52) U.S. Cl.
USPC .................. 345/173; 345/156; 715/701

(58) Field of Classification Search
USPC .............. 345/156–173; 710/1, 5, 8, 58; 715/700–702
See application file for complete search history.

(56) References Cited

U.S. PATENT DOCUMENTS

| 6,005,551 | A | 12/1999 | Osborne et al. |
| 6,278,439 | B1 | 8/2001 | Rosenberg et al. |
| 2004/0104924 | A1* | 6/2004 | Braun et al. ............ 345/701 |
| 2005/0134562 | A1 | 6/2005 | Grant et al. |
| 2005/0184696 | A1 | 8/2005 | Anastas et al. |
| 2006/0017691 | A1 | 1/2006 | Cruz-Hernandez et al. |
| 2006/0119573 | A1 | 6/2006 | Grant et al. |
| 2006/0129719 | A1 | 6/2006 | Cruz-Hernandez et al. |
| 2006/0288137 | A1 | 12/2006 | Grant et al. |
| 2006/0290662 | A1* | 12/2006 | Houston et al. ............ 345/156 |
| 2008/0117175 | A1 | 5/2008 | Linjama et al. |

FOREIGN PATENT DOCUMENTS

| EP | 1 260 949 A1 | 11/2002 |
| EP | 1260949 A1 | 11/2002 |
| EP | 1 401 185 A1 | 3/2004 |
| EP | 1401185 A1 | 3/2004 |
| JP | 3-85481 | 4/1991 |
| JP | 2003-037653 | 2/2003 |
| JP | 2005-506613 | 3/2005 |
| JP | 2006-065507 | 3/2006 |
| JP | 2006-343919 | 12/2006 |
| JP | 2007-034991 | 2/2007 |
| RU | 2 141 741 C1 | 11/1999 |
| WO | 2005/085981 A1 | 9/2005 |
| WO | 2006019389 A2 | 2/2006 |

OTHER PUBLICATIONS

Cyberman 3D SWIFT Supplement:, Version 1.0a; Revised Feb. 10, 1994; Logitech, Inc.; Fremont, CA; pp. 1-33.

* cited by examiner

*Primary Examiner* — Hong Zhou
(74) *Attorney, Agent, or Firm* — Miles & Stockbridge P.C.

(57) ABSTRACT

A haptic feedback system that includes a controller, a memory coupled to the controller, an actuator drive circuit coupled to the controller, and an actuator coupled to the actuator drive circuit. The memory stores at least one haptic effect that is executed by the controller in order to create a haptic effect.

15 Claims, 6 Drawing Sheets

HAPTIC FEEDBACK SYSTEM WITH STORED EFFECTS

RELATED APPLICATIONS

This application is a continuation of U.S. application Ser. No. 11/748,219, filed May 14, 2007, which claims priority to U.S. Provisional Patent Application No. 60/890,690, filed Feb. 20, 2007. These applications are herein incorporated by reference.

FIELD OF THE INVENTION

One embodiment of the present invention is directed to a handheld device with a touchscreen. More particularly, one embodiment of the present invention is directed to a handheld device with a touchscreen that includes a haptic feedback system.

BACKGROUND INFORMATION

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, such as cellular telephones, personal digital assistants (PDAs), portable gaming devices, and a variety of other portable electronic devices. For example, some portable gaming applications are capable of vibrating in a manner similar to control devices (e.g., joysticks, etc.) used with larger-scale gaming systems that are configured to provide haptic feedback. Additionally, devices such as cellular telephones and PDAs are capable of providing various alerts to users by way of vibrations. For example, a cellular telephone can alert a user to an incoming telephone call by vibrating. Similarly, a PDA can alert a user to a scheduled calendar item or provide a user with a reminder for a "to do" list item or calendar appointment.

Increasingly, portable devices are moving away from physical buttons in favor of touchscreen only interfaces. This shift allows increased flexibility, reduced parts count, and reduced dependence on failure-prone mechanical buttons and is in line with emerging trends in product design. When using the touchscreen input device, a mechanical confirmation on button press or other user interface action can be simulated with haptics.

Some known devices modify or generate haptic effects in real-time or "on the fly". Although this allows a wide variety of haptic effects to be generated, it may require a substantial amount of processing power and may not facilitate rapid development of new devices because the wide variety of possible haptic effects must be compatible with the hardware interface of the device.

Based on the foregoing, there is a need for an improved system and method for generating haptic effects for a device.

SUMMARY OF THE INVENTION

One embodiment is a haptic feedback system that includes a controller, a memory coupled to the controller, an actuator drive circuit coupled to the controller, and an actuator coupled to the actuator drive circuit. The memory stores at least one haptic effect that is executed by the controller in order to create a haptic effect. The stored haptic effect, unlike real-time generated haptic effects, reduces the required processing power.

DETAILED DESCRIPTION

Figure 1:
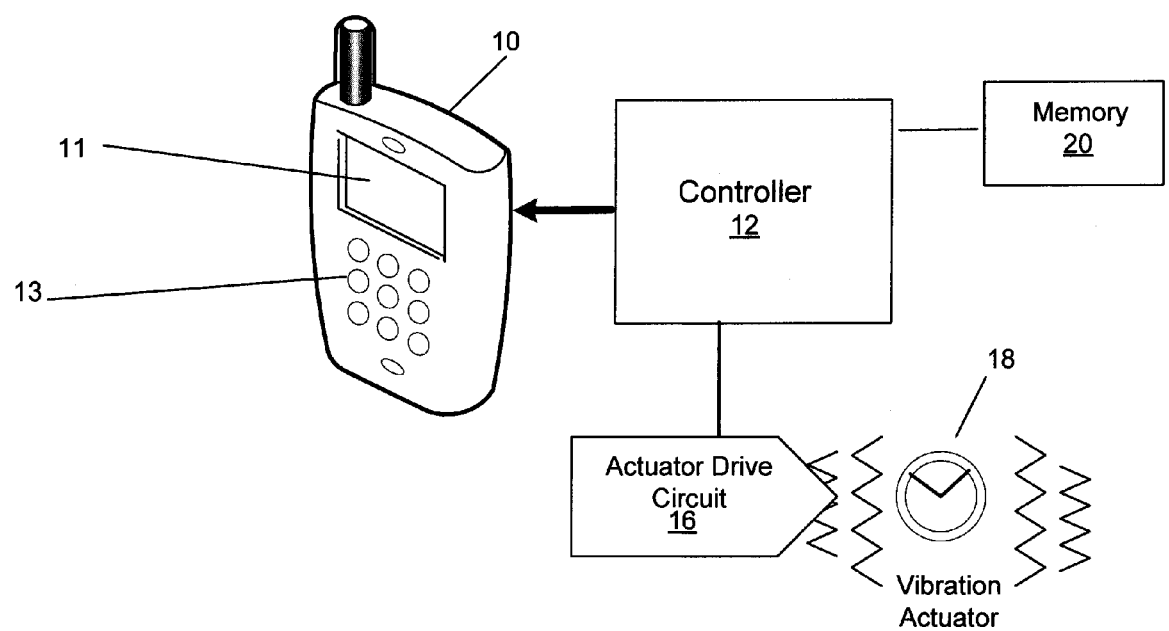
FIG. 1 is a block diagram of a cellular telephone in accordance with one embodiment.

FIG. 1 is a block diagram of a cellular telephone 10 in accordance with one embodiment. Telephone 10 includes a screen 11 and keys 13. In one embodiment, keys 13 are mechanical type keys. In another embodiment, keys 13 can be implemented by a touchscreen or other type of touch sensitive surface so that keys 13 are touchscreen keys, or can be implemented using any method. Internal to telephone 10 is a haptic feedback system that generates vibrations on telephone 10. In one embodiment, the vibrations are generated on the entire telephone 10. In other embodiments, specific portions of telephone 10 can be haptically enabled by the haptic feedback system, including individual keys of keys 13, whether the keys are mechanically oriented, touchscreen, or some other type of implementation.

The haptic feedback system includes a controller 12. Coupled to controller 12 is a memory 20 and an actuator drive circuit 16, which is coupled to a vibration actuator 18. Although the embodiment of FIG. 1 is a cellular telephone, embodiments of the present invention can be implemented with any type of handset or mobile/portable device, or any device that uses an actuator to generate vibrations. Further, the haptic feedback system may be implemented as a development board that allows manufacturers of haptically enabled handsets to perform rapid prototypes.

Controller 12 may be any type of general purpose controller or processor, or could be a controller specifically designed to provide haptic effects, such as an application-specific integrated circuit ("ASIC"). Controller 12 may be the same controller/processor that operates the entire telephone 10, or may be a separate controller. Controller 12 can decide what haptic effects are to be played and the order in which the effects are played based on high level parameters. In general, the high level parameters that define a particular haptic effect include magnitude, frequency and duration.

Controller 12 outputs the control signals to drive circuit 16 which includes electronic components and circuitry used to supply actuator 18 with the required electrical current and voltage to cause the desired haptic effects. Actuator 18 is a haptic device that generates a vibration on telephone 10. Actuator 18 can include one or more force applying mechanisms which are capable of applying a vibrotactile force to a user of telephone 10 (e.g., via the housing of telephone 10).

Actuator 18 may be, for example, an electromagnetic actuator, an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electroactive polymers or shape memory alloys. Memory 20 can be any type of storage device, such as random access memory ("RAM") or read-only memory ("ROM"). Memory 20 stores instructions executed by controller 12. Memory 20 may also be located internal to controller 12, or any combination of internal and external memory.

Figure 2:
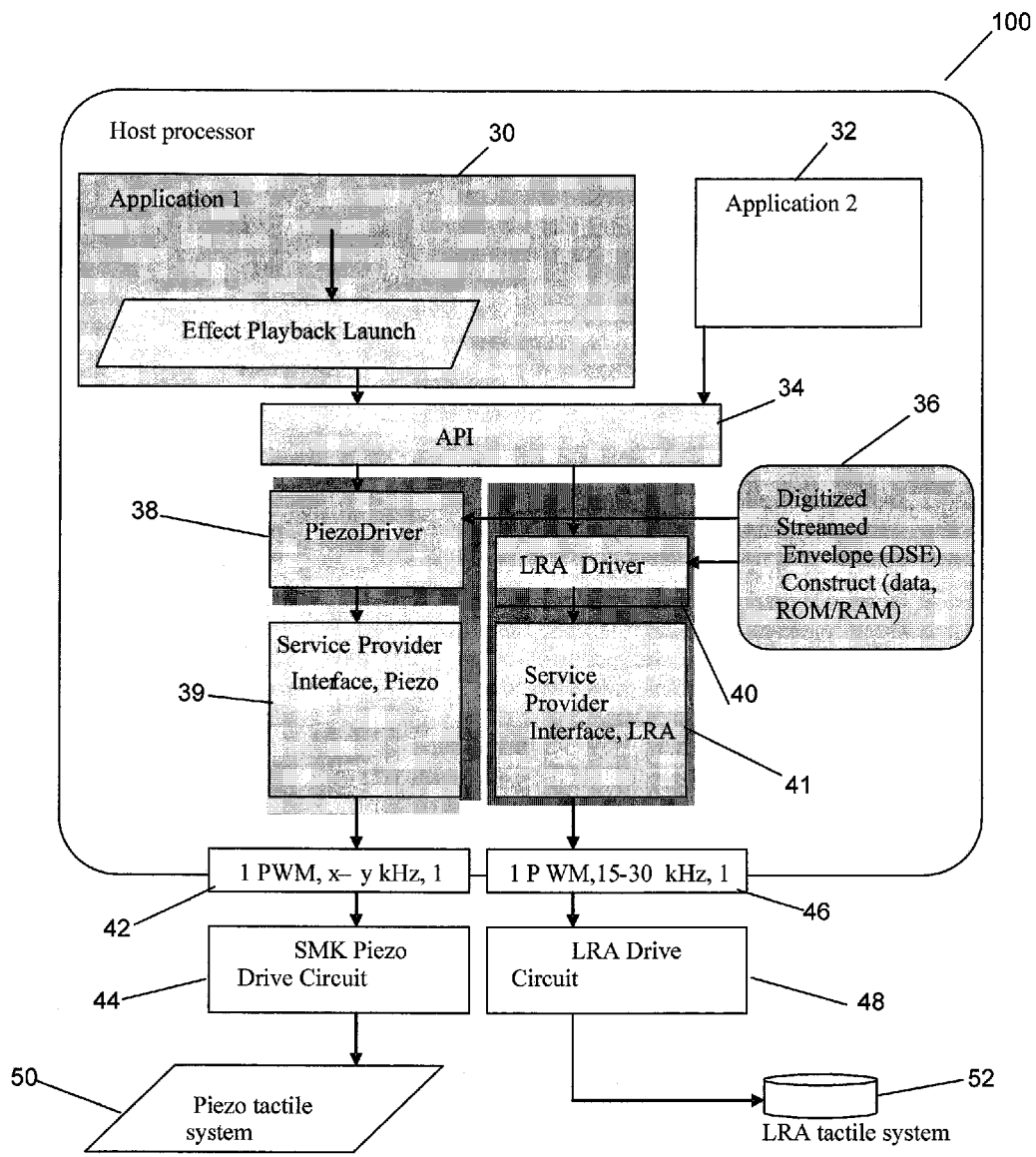
FIG. 2 is a block diagram of the system architecture of a haptic feedback system in accordance with one embodiment.

FIG. 2 is a block diagram of the system architecture of a haptic feedback system 100 in accordance with one embodiment. System 100 includes two or more applications 30 and 32 that call, via software commands, for a specific stored haptic effect to be played. Application program interface ("API") 34 interprets the software commands and outputs to two parallel paths, one for each type of actuator. In other embodiments, one or more paths may be implemented. In FIG. 2, the left-side path is for a piezo actuator 50 while the right-side path is for an LRA actuator 52.

Coupled to each path is a digitized stream envelope ("DSE") construct 36 which includes stored haptic effects. In one embodiment, four different haptic effects are stored, but any number may be stored. Each path includes a driver 38 and 40 and a service provider interface 39 and 41 that include information on the specific type of actuator for the path. This allows the API to be hardware/actuator independent.

Each path further includes, for each actuator, a drive signal 42 and 46 and an electrical drive circuit 44 and 48. Finally, actuators 50 and 52 generate the vibration or other desired haptic effect.

In one embodiment, the piezo actuator driver expects a differential sine wave control signal. One embodiment generates a sine wave in software at a 5 kHz rate and outputs that as a pulse width modulation ("PWM") signal. A simpler control signal may be used to achieve the same feel on the device. However, in one embodiment, the piezo circuit requires a PWM signal with fixed frequency in the 20-50 kHz range, whose duty cycle is expected to be updated every 200 µs.

In one embodiment, there are at least 3 possible physical configurations for the LRAs:
1. Case mounting—In this configuration, the LRAs are mounted rigidly to the interior of the device casing. The LRA is driven at its resonant frequency (from 175 Hz to 185 Hz), and the entire device is actuated.
2. Screen mounting—matched frequency. The screen is floated on a suspension, mechanically isolated from the casing, and the LRAs are rigidly mounted to the screen. The LRAs is typically driven at the LRA resonant frequency, and the suspension is tuned to reinforce that frequency.
3. Screen mounting—bi-modal. The screen is floated on a suspension, mechanically isolated from the casing, and the LRAs are rigidly mounted to the screen. The LRA can be driven at the LRA resonant frequency in which case the suspension is tuned to transmit most of the vibration to the casing. The LRA can also be driven at the system's natural frequency, with the suspension tuned to a higher frequency than the LRA's own resonant frequency (typically approx. 500 Hz). In this configuration, the LRA can be used both as an event alerting system (Silent/Manner mode vibration alerter) or as a touchscreen feedback system (for button press tactile confirmation).

In one embodiment, many variants of the known Vibe-Tonz® LRA drive circuit from Immersion Corp. can be used. Generally, these drive circuits require one PWM at 20-50 kHz fixed frequency, variable duty cycle, 8-bit duty cycle resolution, 50%=no output, with a fine granularity in the 20-30 kHz range (as the carrier frequency is a multiple of the LRA drive frequency in many designs). The circuit also requires a General Purpose Output ("GPO") for AMP_ENABLE control.

Alternately, an even simpler amp circuit could be used, because a 5 or 8 kHz output rate from the driver would allow output of sine or square waveforms at the LRA resonant frequency. This eliminates the need to fine-tune the PWM frequency, as the resonant frequency would itself be encoded.

Figure 3:
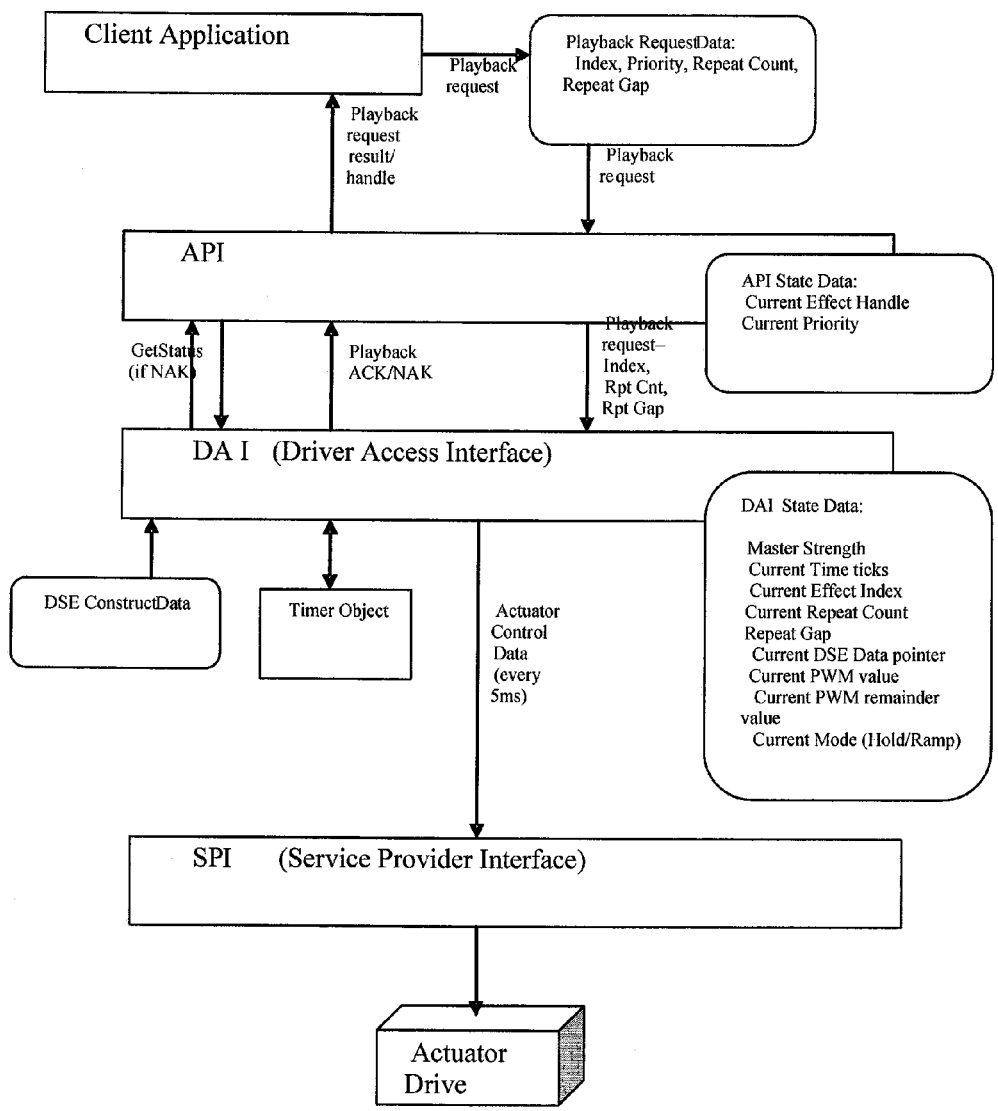
FIG. 3 is a block diagram of the software architecture in accordance with one embodiment.

FIG. 3 is a block diagram of the software architecture in accordance with one embodiment. One embodiment of the architecture includes the following:
1. No custom effect playback for applications. Only predefined effects ("stored haptic effects"), stored in Digitized Streaming Envelope ("DSE") constructs stored in the driver software can be played back.
2. No real-time generation. Effect playback is based on a pre-recorded control signal, not generated in real-time. The control signal is computed using an effect design tool.
3. Multiple application support. Multiple applications could register with the API simultaneously. Supporting multiple applications requires some form of API client marshaling, where the API must determine whose request is most important. Two approaches are possible:
  a. Last caller wins. When multiple applications try to use the vibration resource simultaneously, the last caller interrupts whatever was playing before and its effect plays.
  b. Priority scheme. The API could support a concept of high/medium/low priority on effect playback launch. When launching an effect, the caller specifies the priority to be used. Playback succeeds when priority is equal to or higher than the current effect's playback priority.
4. Designed for portability. Like VibeTonz®, ANSI C only, no dynamic memory allocation.

In one embodiment, the Driver Access Interface ("DAI") consists of lower-level functions that provide the bulk of the API functionality. In one embodiment, the DAI is designed to be implemented as a functional interface, which is easily wrapped in a serial protocol. The driver is a timed loop that executes the following commands:
1. Look at API/Driver shared memory. If playback is scheduled, retrieve current DSE pointer from memory, along with any other required driver/effect state information.
2. If state is "playing effect", decode DSE, extract PWM value to be applied to PWM. Then write to PWM. Sleep until next sample.
3. If state is "finished iteration check for repeat", and if effect is to be repeated, decrement repeat value, set up gap timing and sleep until gap time expires.

In one embodiment, DSE construct 36 of FIG. 2 is a set of magnitudes, or strengths, over time, for a number of effects. The samples are stored in a lossless compact format. Files containing DSE information use the .dse file extension.

Figure 4:
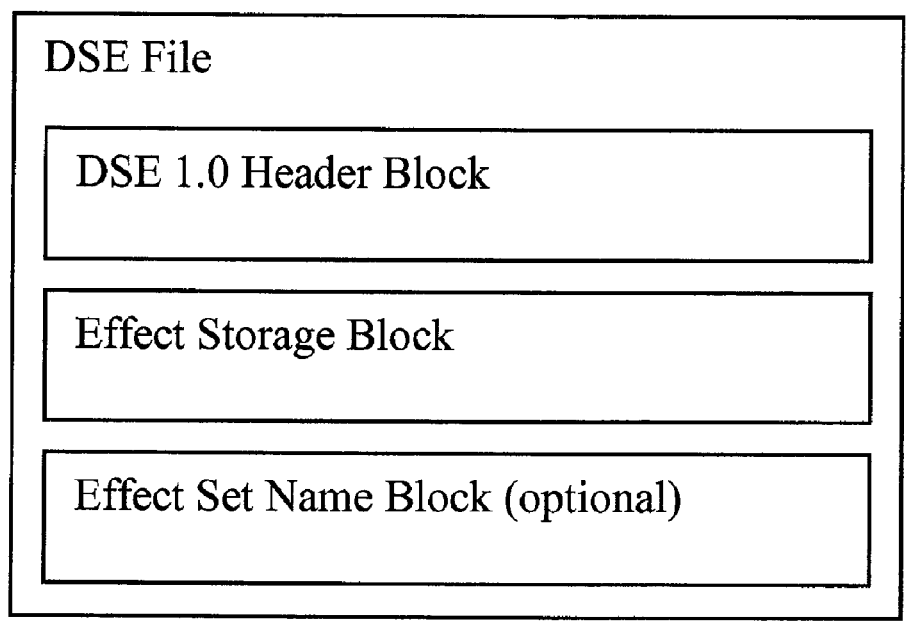
FIG. 4 is a block diagram of the file format used in one embodiment for a digitized steam envelope construct.

FIG. 4 is a block diagram of the file format used in one embodiment for the DSE construct. The DSE 1.0 Header Block contains file format version information, number of effects, location of the Effect Storage Block, location of the Effect Set Name Block, and file size. The Effect Storage Block contains all the effect definitions stored in the DSE file. The Effect Set Name Block, which is optional, contains the name of the effect set.

Figure 5:
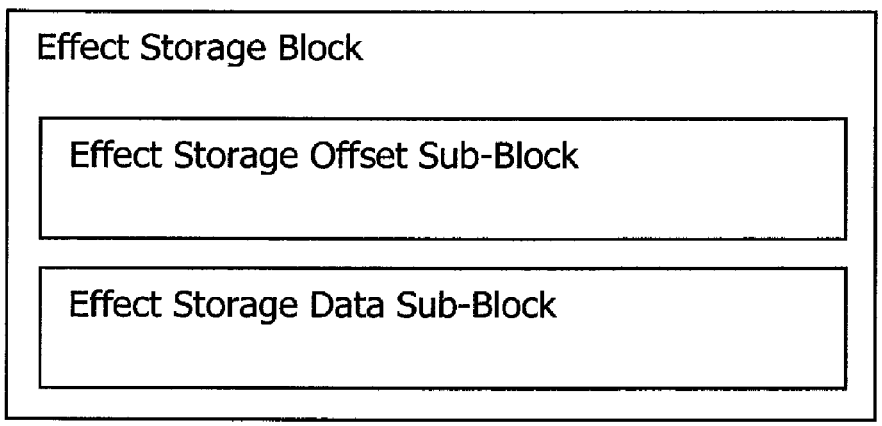
FIG. 5 is a block diagram of an Effect Storage Block in accordance with one embodiment.

FIG. 5 is a block diagram of the Effect Storage Block, in accordance with one embodiment, which has two sub-blocks: an Effect Storage Offset Sub-Block and an Effect Storage Data Sub-Block.

The Effect Storage Offset Sub-Block is an array of offsets, one offset for each effect. Each offset occupies two bytes with the least-significant byte at the lower memory address. The number of effects is stored in the DSE file header. The offset, in bytes, specifies where in the Effect Storage Data Sub-Block the effect's definition begins relative to the start of the Effect Storage Data Sub-Block. The size of the Effect Storage Offset Sub-Block is 2*EFFECTCOUNT. The EFFECTCOUNT comes from the DSE file header. The Effect Storage Data Sub-Block stores the effect definitions.

In one embodiment, the DSE contains magnitude control information over time. An idealized voltage, from −127 to 127, is modulated over time to drive a vibration actuator. For AC control (e.g., LRAs), other parts of the system (driver software, electronics) are responsible for synthesizing the AC signal, and the DSE represents the maximum value attained, per cycle, by the AC control signal.

Figure 6:
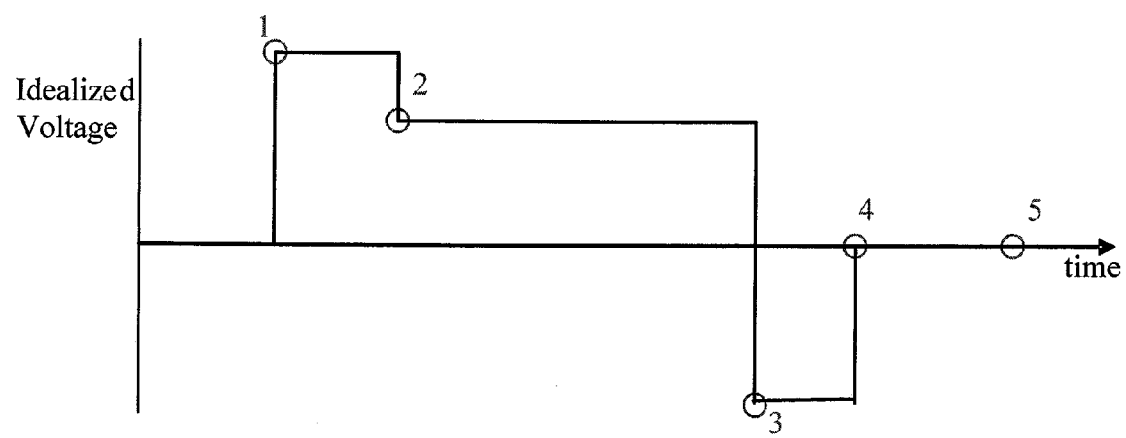
FIG. 6 illustrates a typical short control signal or stored haptic effect where the critical data to be encoded is clearly identified in accordance with one embodiment.

FIG. 6 illustrates a typical short control signal or stored haptic effect where the critical data to be encoded is clearly identified in accordance with one embodiment. Unlike known systems that generate haptic effects in real-time by generating haptic effects from a plurality of high level parameters, the haptic effect in FIG. 6 is predefined with the low level haptic parameters such as voltage levels and time duration.

Point 1 is the start of the haptic effect, which is always assumed to start at time t=0 ms. Assume that idealized voltage level is 127. The time between point 1 and point 2 is the kickstart pulse. Point 2, occurring at, for example, time=20 ms, identifies the start of the sustain period, with voltage level 80 applied. This level is applied until point 3 at time=100 ms, for example, where a braking pulse starts, with voltage at −127. At point 4, time t=120 ms, voltage drops to 0. An additional zero point, point 5, is placed at t=150 ms to encode a certain amount of silence—useful when the effect is designed to be repeated (the same effect can be obtained by specifying a gap value in a DAI/API call). Table 1 below is an example of how the critical points and timings are encoded in one embodiment.

TABLE 1

| Byte # | Data | Meaning |
| --- | --- | --- |
| 0 | 127 | Apply voltage level 127 . . . |
| 1 | 20 | For 20 ms. |
| 2 | 80 | Apply voltage level 80 . . . |
| 3 | 80 | For 80 ms. |
| 4 | −127 | Apply voltage level −127 . . . |
| 5 | 20 | For 20 ms. |
| 6 | 0 | Apply voltage level 0 . . . |
| 7 | 30 | For 30 ms. |
| 8 | 0 | Apply voltage level 0 . . . |
| 9 | 0 | For 0 ms - this means, "end of digitized streamed effect definition". |

In one embodiment a slightly more complex encoding that incorporates a slope encoding is shown in Tables 2 and 3 below. Regarding table 2, the following applies:

1. Data is organized in voltage/time pairs.
2. Time is relative, not absolute. "Apply X voltage for the next Y milliseconds", and not "Apply voltage X starting at time=Y".

TABLE 2

Generalized Voltage/Time Pair Encoding, "Set & Hold" Pair:

| Byte # | Bits | Data | Meaning |
| --- | --- | --- | --- |
| 0 | 7 | Ramp/nHold | 0 => Hold this voltage level constant for this duration |
| 0 | 6 . . . 0 | Voltage/2 | Voltage level to be applied, divided by 2. Use a single left shift command and cast to a signed 8-bit integer to obtain the desired voltage level between −127 and 127. The driver should always add 1/−1 to the result unless the value is 0. |
| 1 | 7 . . . 0 | Time, ms/5 | Time, in 5 ms increments. For best results, the driver code should run the control loop at 200 Hz. Maximum time that can be encoded = 255 × 5 ms = 1.275 sec. For longer durations, create a sequence of voltage/time pairs. |

TABLE 3

Generalized Voltage/Time Pair Encoding, "Set & Ramp" Pair:

| Byte # | Bits | Data | Meaning |
| --- | --- | --- | --- |
| 0 | 7 | Ramp/nHold | 1 => Start at the voltage level and ramp according to the enclosed parameters for the specified duration |
| 0 | 6 . . . 0 | Voltage/2 | Voltage level to be applied at time 0, divided by 2. Use a single left shift command and cast to a signed 8-bit integer to obtain the desired voltage level between −127 and 127. The driver should always add 1/−1 to the result unless the value is 0. |

TABLE 3-continued

Generalized Voltage/Time Pair Encoding, "Set & Ramp" Pair:

| Byte # | Bits | Data | Meaning |
|---|---|---|---|
| 1 | 7...0 | Time, ms/5 | Time, in 5 ms increments. For best results, the driver code should run the control loop at 200 Hz. Maximum time that can be encoded = 255 × 5 ms = 1.275 sec. For longer durations, create a sequence of voltage/time pairs. |
| 2 | 7...0 | Slope | −128, or −127 to 127. Whole part of the slope value, representing whole PWM steps to be taken every 5 ms. −128 represents a Slope of "negative 0", versus "positive 0", which is 0. More on slope below. |
| 3 | 7...0 | SlopeFrac | 0 . . . 255. Fractional part of the slope value, expressed as a fraction of 256. More on slope below. |

Using Slope and SlopeFrac
The driver can use these values in the following way:
pwm=Voltage<<1; /* Initial PWM value */
pwm_rem=0; /* Initial PWM remainder */
In 5 ms loop:

```
If( (pwm_rem + SlopeFrac) < pwm_rem ) /* this remainder is about to rollover */
{
Slope >= 0 ? pwm++ : pwm--;
}
pwm_rem += SlopeFrac;
if( −128 != Slope) pwm += Slope;
```

The Effect Name Block, which is optional, has one sub-block: an Effect Name Data Sub-Block.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A haptic feedback system comprising:
a processor;
a memory coupled to the processor, wherein the memory stores a plurality of pre-defined haptic effects;
an actuator drive circuit coupled to the processor; and
an actuator coupled to the actuator drive circuit;
wherein the processor is adapted to output a first stored haptic effect of the pre-defined haptic effects in response to a haptic effect request;
wherein the haptic effect request is a control signal generated in response to a first application that identifies the first stored haptic effect to be played;
wherein the output causes the first stored haptic effect to be played;
wherein the entire haptic output in response to the haptic effect request consists of the first stored haptic effect;
wherein an application program interface (API) receives the haptic effect request from the first application and retrieves the requested first stored haptic effect, wherein the first application is registered with the API and a second application is also registered with the API and has access to the first stored haptic effect.

2. The haptic feedback system of claim 1, wherein the haptic effect request comprises an identity of the pre-defined haptic effect to be outputted.

3. The haptic feedback system of claim 1, wherein each of the plurality of pre-defined haptic effects are stored as a digitized streamed envelope construct.

4. The haptic feedback system of claim 1, further comprising:
a second actuator drive circuit coupled to the processor; and
a second actuator coupled to the second actuator drive circuit;
wherein the second actuator is a different type of actuator than the actuator.

5. The haptic feedback system of claim 1, wherein the haptic effect request comprises a priority, and the first stored haptic effect is outputted based on the priority.

6. The haptic feedback system of claim 1, wherein the first stored haptic effect is outputted to the actuator drive circuit, and in response the actuator drive circuit generates a haptic feedback signal that is applied to the actuator to generate haptic feedback.

7. The haptic feedback system of claim 6, wherein the haptic feedback signal is based only on one of the predefined haptic effects.

8. A method of generating haptic feedback comprising:
receiving a request for one of a plurality of pre-defined stored haptic effects, wherein the request is a control signal generated in response to a first application that identifies the haptic effect out of the plurality of haptic effects to be played;
retrieving the requested pre-defined stored haptic effect;
generating drive signals based on the retrieved pre-defined stored haptic effect; and
applying the drive signals to an actuator;
wherein the entire haptic output in response to the request consists of the requested pre-defined stored haptic effect;
wherein an application program interface (API) receives the haptic effect request from the first application and retrieves the requested pre-defined stored haptic effect, wherein the first application is registered with the API and a second application is also registered with the API and has access to the requested pre-defined stored haptic effect.

9. The method of claim 8, wherein each of the plurality of pre-defined haptic effects are stored as a digitized streamed envelope construct.

10. The method of claim 8, wherein the request comprises a priority, and the one of the pre-defined haptic effects is retrieved based on the priority.

11. The method of claim 8, wherein the haptic feedback is generated from only the pre-defined stored haptic effects.

12. A non-transitory computer readable medium having instructions stored thereon that, when executed by a processor, causes the processor to generate haptic feedback, the instructions comprising:

receiving a request for one of a plurality of pre-defined stored haptic effects, wherein the request is a control signal generated in response to a first application that identifies the haptic effect out of the plurality of haptic effects to be played;

retrieving the requested pre-defined stored haptic effect;

generating drive signals based on the retrieved pre-defined stored haptic effect; and applying the drive signals to an actuator;

wherein the entire haptic output in response to the request consists of the requested pre-defined stored haptic effect;

wherein an application program interface (API) receives the haptic effect request from the first application and retrieves the requested pre-defined stored haptic effect, wherein the first application is registered with the API and a second application is also registered with the API and has access to the requested pre-defined stored haptic effect.

13. The computer readable medium of claim 12, wherein each of the plurality of pre-defined haptic effects are stored as a digitized streamed envelope construct.

14. The computer readable medium of claim 12, wherein the request comprises a priority, and the one of the pre-defined haptic effects is retrieved based on the priority.

15. The computer readable medium of claim 12, wherein the haptic feedback is generated from only the pre-defined stored haptic effects.

\* \* \* \* \*